Sept. 29, 1959 R. B. LOVE 2,906,335
CREDIT CARD PUNCHING DEVICE
Filed April 20, 1955 2 Sheets-Sheet 1
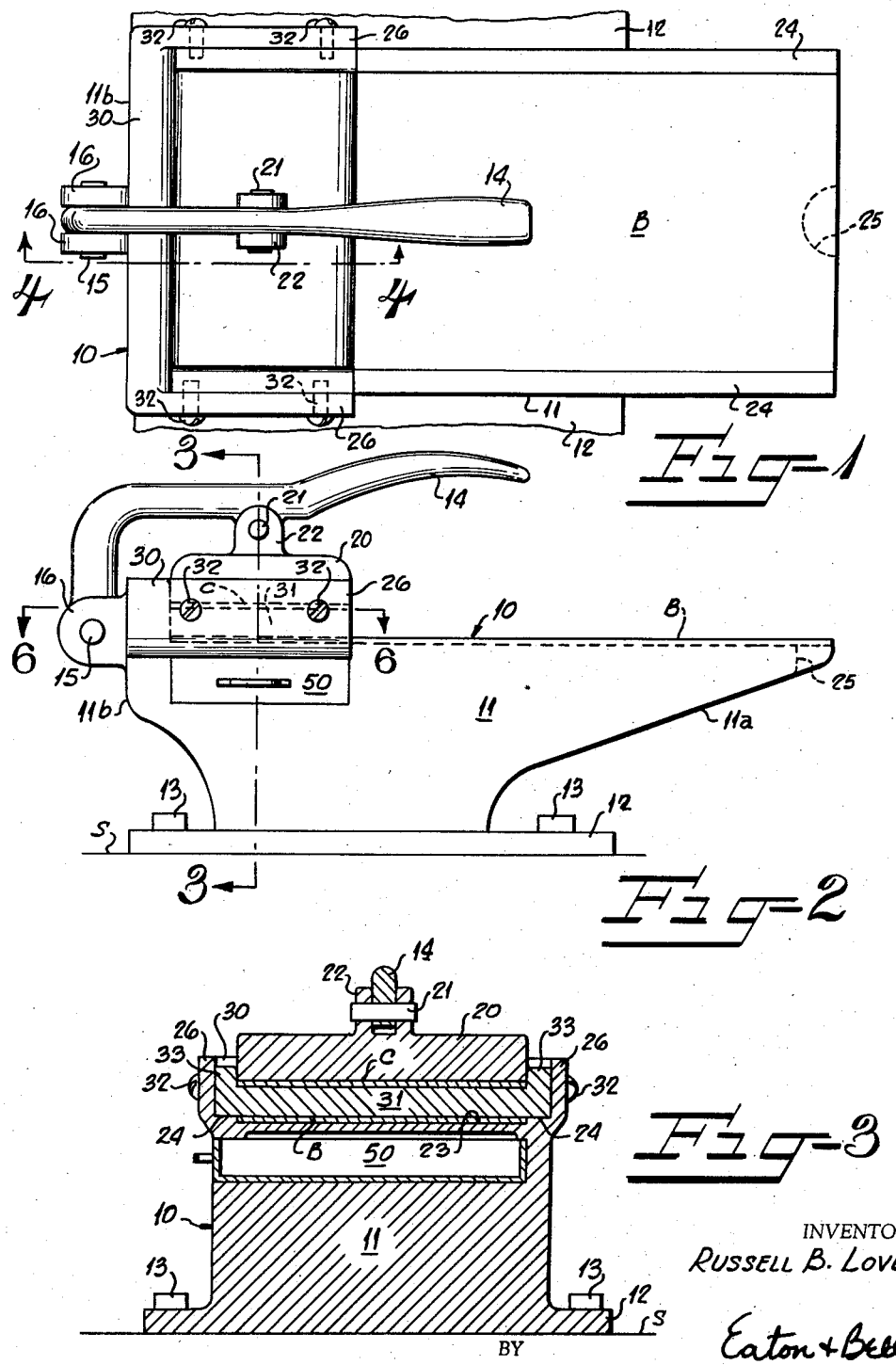
INVENTOR:
RUSSELL B. LOVE.
BY Eaton + Bell
ATTORNEYS

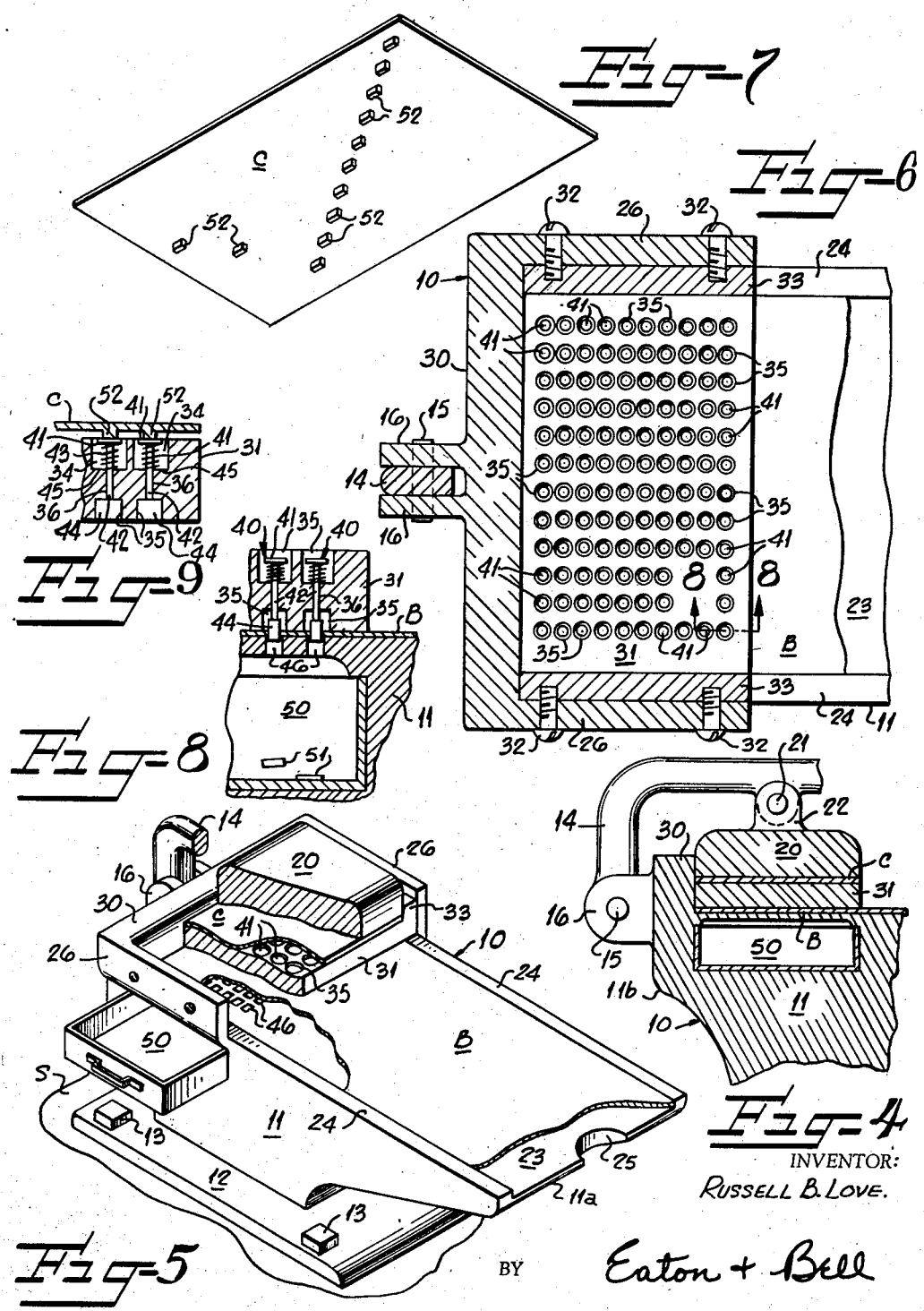

United States Patent Office

2,906,335
Patented Sept. 29, 1959

2,906,335

CREDIT CARD PUNCHING DEVICE

Russell B. Love, Charlotte, N.C., assignor of fifteen percent each to Paul M. Love, Charlotte, and Wayne B. Love, Stanfield, N.C.

Application April 20, 1955, Serial No. 502,636

1 Claim. (Cl. 164—114)

This device relates to a card punching device and more particularly to a credit card punching device wherein a credit card having raised portions on a surface thereof which spell out in code the name and address and other pertinent information of a credit card owner is utilized for punching holes in a business card so the same may be used in an automatic card indexing machine for later billing the appropriate party.

An object of this invention is to provide a credit card punching device wherein a credit card is inserted having raised portions on one surface thereof and means are provided for pressing these raised portions on the credit card against punch means to punch holes in a business card to correspond with the raised portions of the credit card.

Another object is to provide a credit card punching device wherein is provided a plurality of punch members for punching business cards from a credit card having raised portions or projections on the lower surface thereof selectively arranged to correspond with certain of the punches so that when a force is applied downwardly on the credit card the punches will operate to make perforations in the business card corresponding with the selected arrangement of abutments or projections on the bottom surface of the credit card.

A further object of the invention is to completely eliminate the present credit card system wherein a person carries a card with his name and address imprinted thereon and the store or seller has a device for duplicating the same on a purchase ticket. This credit card punching device will permit the purchase ticket to be used in an automatic card indexing machine which heretofore had not been possible.

A further object of the invention is to enable a person to punch one or more holes in a business card at the same time thereby eliminating single or individual punches.

Some of the objects of the invention having been stated, other objects will appear as the description proceeds, when taken in connection with the accompanying drawings, in which—

Figure 1 is a top plan view of the credit card punching device;

Figure 2 is a side elevation of the credit card punching device;

Figure 3 is a transverse vertical section along the line 3—3 in Figure 2;

Figure 4 is a fragmentary longitudinal vertical section with some of the parts broken away for purposes of clarity;

Figure 5 is an isometric view of the credit card punching device with parts broken away for purposes of clarity;

Figure 6 is a fragmentary longitudinal horizontal section taken along line 6—6 in Figure 2;

Figure 7 is an isometric view of a credit card taken from the bottom and showing the plurality of raised portions or abutments thereon;

Figure 8 is a fragmentary enlarged vertical section taken along line 8—8 in Figure 6;

Figure 9 is a fragmentary vertical section of the punch board and credit card and showing the manner in which the credit card engages the punches therein.

Referring more specifically to the drawings, the reference numeral 10 broadly indicates a card punching device having a body portion 11 provided with front and back ends 11a and 11b, respectively, and a base 12 secured by any suitable means such as bolts 13 to a surface S. An operating lever or handle 14 is secured by pivot means 15 to a bifurcated portion 16 extending from the back end 11b of the body 11. To the lever 14 is connected a press 20 preferably pivotally secured by a pin 21 between bifurcated press portions or upstanding ear-like members 22 of the press 20.

The body 11 is provided with a substantially flat table or card receiving portion 23 having a pair of spaced vertical side shoulders 24 and a cut out or recessed front edge portion 25. The side shoulders 24 serve to facilitate the inserting of a business machine card B, which is to be punched, in proper alinement on the table 23, and the cut out or recessed edge portion 25 enables the business card B to be grasped between the fingers for readily withdrawing the same after being punched.

On the top of the rear end of the body portion 11 are provided a pair of upstanding spaced side walls 26 connected together by a sloping rear shoulder or wall 30 of the same height. It will be noted particularly in Figures 3 and 5 that the side walls 26 extend upwardly from the outer edge of the shoulders 24 to thus confine the shoulders 24 therebetween.

An integral punch board or punch holder 31 formed of rigid material is positioned to rest on the back portions of the shoulders 24 and to be confined by the shoulders 26 and 30 with suitable securing means such as screws 32 securing the punch board 31 in proper position to the inner sides of the pair of shoulders 26. Punch board 31 is provided with a recess, credit card, or punch actuator receiving portion defined by a pair of parallel spaced punch board shoulder portions 33 which act as a guiding surface for positioning a credit card or punch actuator C therein. It will be noted in Figure 3 that the inner side of punch board shoulder portions 33 is alined with the inner side of shoulders 24 defining the table 23 to thereby aline the business card B with the credit card C.

The punch board 31 has a plurality, preferably one hundred and twenty, of spaced circular apertures 34 arranged in the upper surface portion thereof and corresponding rectangular apertures 35 spaced therebelow and connected to each other by a punch guiding slot or passageway 36. A plurality of punches broadly indicated at 40 are positioned in the punch receiving apertures 34, 35, 36. Each of the punches 40 has a head portion 41, a stem portion 42 provided with a resilient member or coiled throwback spring 43 encircling it, and a cutting head 44, preferably rectangularly shaped.

The head 41 and the coil spring 43 are received in the aperture 34 with the lower portions of the spring confined against a bottom wall 45 of the aperture 34 and the top portion of the spring is confined by the lower surface of the head 41. The stem 42 slidably penetrates the guiding slot 36 with the cutting head 44 attached to the lower end thereof and guided in the aperture 35.

The table 23 has a plurality of holes or punch receiving apertures 46 provided on its rear portion corresponding in number with the punches 40 in the punch board 31. As will be observed in Figures 5 and 8, the holes 46 are preferably rectangularly shaped and so dimensioned to receive the cutter head 44, also preferably rectangularly shaped, of punches 40 which punches are alined with said holes to freely penetrate therein and during such penetration punch holes in the business card B.

A waste receptacle drawer 50 is provided with a handle and is suitably positioned in the side of the body 11 to receive the cut out or waste portions 51 punched from the business card B by the punches 40.

The credit card C positioned between the press 20 and punch board 31 has a plurality of raised portions or projections 52 on the lower surface thereof as shown in Figure 7 which are arranged to correspond with a like number of the punches 40 in the punch board 31 for punching holes in the business card B.

The credit card C may be made of any suitable material such as stiff cardboard, metal, plastic, rubber, etc. Preferably, thin metal is employed since the projections 52 may be easily formed by stamping the thin metal sheet by conventional stamping apparatus wherein recessed portions are provided in one surface of the material and corresponding raised portions on the opposite surface. Also, the thin metal may have portions cut out of the metal and bent down from one surface to form projections such as 52.

*Operation of the credit card punching device*

To operate the credit card punching device the business card B is inserted on the table 23 between the confining shoulder portions 24 until it abuts the rear shoulder 30. Since the operating lever or handle 14 is in raised position, not shown in the drawings, the credit card C can be placed on top of the punch board 31 between the confining punch board shoulder portions 33. Then the operating lever or handle 14, guiding the press 20, is lowered and a slight downward pressure is exerted on the end of handle 14 to thus force the raised portions or projections 52 on the credit card C against the head portion 41 of punches 40 to thereby move the cutting head 44 against the business machine card B and down through apertures 46 provided in the rear portion of table 23 to thus punch holes in the business card B. After the holes have been punched in the business card B to correspond with the raised portions 52 on the credit card C the spring 43 of the punches 40 will cause the punches 40 to be retracted into the apertures 35 in the bottom portion of the punch board 31 to thus clear the business card B so the same may be readily withdrawn from the credit card punching device when the handle portion or operating lever 14 is elevated.

It will thus be seen that there has been provided a novel punching device wherein a credit card is used as a pattern for punching holes in a business machine card so the same may later be used in a high speed filing or indexing machine to thereby reduce administrative cost of operating a credit service.

In the drawings and specification there has been set forth a preferred embodiment of the invention and, although specific terms are employed, they are used in a generic and descriptive sense only, and not for purposes of limitation, the scope of the invention being defined in the claim.

I claim:

A device for punching holes in a business card comprising a body portion having a flat upper surface portion thereon provided with a plurality of apertures therein upon which the business card is positioned, an integral punch board formed of rigid material spaced above said flat upper surface portion, said punch board having a plurality of spaced apertures in the upper portion thereof alined with apertures in said upper surface portion of said body portion, a plurality of corresponding punches positioned in said apertures of the punch board with resilient means encircling each punch for normally maintaining the upper and lower ends of each of the punches flush with the upper and lower surfaces of the punch board, a credit card provided with a predetermined number of projections extending from its lower surfaces and engaging the upper end of corresponding punches, a press resting on said credit card, and means for moving said press downwardly against the credit card whereby the projections on the credit card will be received in corresponding apertures of the punch board while moving the corresponding punches downwardly through the business card and the corresponding apertures in the top portion of the body portion to cut holes in the business card.

References Cited in the file of this patent

UNITED STATES PATENTS

| | | |
|---|---|---|
| 725,391 | Ameglang | Apr. 14, 1903 |
| 957,221 | Lamkin | May 10, 1910 |
| 1,728,475 | Cavill | Sept. 17, 1929 |
| 1,748,083 | Roberts | Feb. 25, 1930 |
| 2,134,815 | Elliott | Nov. 1, 1938 |
| 2,213,567 | Mills et al. | Sept. 3, 1940 |
| 2,225,313 | McCart | Dec. 17, 1940 |
| 2,557,504 | Holmes | June 19, 1951 |
| 2,558,044 | Emmer | June 26, 1951 |
| 2,587,749 | Misson | Mar. 4, 1952 |
| 2,647,459 | Murphy | Aug. 4, 1953 |
| 2,736,379 | Winn et al. | Feb. 28, 1956 |

FOREIGN PATENTS

| | | |
|---|---|---|
| 455,455 | Italy | Mar. 1, 1950 |